United States Patent Office 2,921,000
Patented Jan. 12, 1960

2,921,000

THROMBOPLASTIN

Heron O. Singher, Plainfield, and Emanuel A. Swart, Somerville, N.J., assignors to Ortho Pharmaceutical Corporation, a corporation of New Jersey No Drawing. Application May 22, 1956
Serial No. 586,366

17 Claims. (Cl. 167—74)

This invention relates to a method for the preparation of thromboplastin and more particularly relates to a method for the extraction of thromboplastin from rabbit brain or lung tissue or mixtures thereof. The present application is a continuation-in-part of my application Serial No. 432,894, filed May 27, 1954, now Patent No. 2,847,347.

Thromboplastin has accepted value for use in the determination of prothrombin time, which is a measure of the amount of prothrombin present in a tested blood sample. The determination of prothrombin time is useful clinically, for the fact that it varies with a variety of clinical situations has been well established. It is known that vitamin deficient diets may result in prolonged prothrombin time. Biliary diseases frequently result in prolonged prothrombin time and are considered to be related to impaired vitamin K absorption. Impaired liver function results in prolongation of prothrombin time. A variety of drugs such as the salicylates and especially Dicumarol affect the prothrombin time to a degree considered sufficient to be of clinical significance.

The two-stage theory of Morawitz for the mechanism of blood coagulation postulates, as a first stage, the interaction of prothrombin, calcium ion, and thromboplastin which results in the formation of thrombin and, as a second stage, the reaction of thrombin with fibrinogen to form fibrin. Fibrin fibers are largely responsible for the characteristic properties of clotted blood. It has been shown that the addition to blood of small amounts of thromboplastin can accelerate clotting time, generally referred to as prothrombin time, from the usual several minutes down to a few seconds. Thromboplastin, otherwise known as the platelet-tissue factor, is essential to the blood clotting mechanism but has not been definitely identified chemically. The mechanism of the activity and function of thromboplastin in blood clotting is not settled but most workers believe it to be enzymatic and that thromboplastin acts to catalyze the conversion of prothrombin to thrombin probably through an intermediate prothrombin-thromboplastin-calcium complex. Since thrombin is a protein essential to the formation of fibrin and thromboplastin is necessary for the conversion of prothrombin to thrombin, the measurement of prothrombin time, wherein a standardized preparation of thromboplastin is used, has come to be considered as yielding information of great clinical value.

It is an object of this invention to provide an improved thromboplastin product.

It is another object of this invention to provide a method for destroying the inhibitors and activators associated with thromboplastin to obtain a standardized preparation of thromboplastin having activity predictable on the basis of determinations carried out with a variety of human plasma samples.

It is another and further object of this invention to provide a method for the preparation of thromboplastin of high activity for use in determining prothrombin time.

It is still another object of this invention to prepare a lyophilized product having a high degree of reproducibility; that will release the appropriate concentration of calcium ions on reconstitution of the lyophilized solid.

Other objects and more particular advantages of the invention will be apparent from the following description and exemplary disclosures.

The objects of this invention are accomplished and an improved thromboplastic material provided by a process in which a first thromboplastic material prepared according to the method of A. J. Quick disclosed in "The Physiology and Pathology of Hemostasis," Lea and Febiger, Philadelphia (1951), p. 121, which comprises the trituration of rabbit brain tissue with an organic solvent such as acetone, is suspended in an aqueous suspension of a second thromboplastic material obtained by the extraction of finely divided rabbit brain or lung tissue, or a mixture of these tissues, with a buffered aqueous alcohol solution containing a low molecular weight amino acid. The suspension is incubated, centrifuged, calcium gluconate is added to the supernatant, and the suspension is centrifuged a second time. Lyophilization of the supernatant from the second centrifugation yields a solid having a greater stability and higher thromboplastic activity than either of the initial thromboplastic materials as evidenced by prothrombin time determinations.

In order that the thromboplastin material prepared according to the process of this invention have an activity greater than that of the initial thromboplastic materials, it is necessary that for each 10 ml. portion of aqueous suspension of thromboplastin extract of lung or brain tissue, or mixture thereof, the initial thromboplastin material prepared according to the method of Quick be present in an amount of 10 to 400 mgs. About 20 to 100 mgs. of the thromboplastic material prepared by the extraction of rabbit brain or lung tissue, or mixtures thereof, is present in each 10 ml. portion of suspension. The suspension is incubated for about 20 minutes at 50° C. and centrifuged. Sufficient aqueous calcium gluconate solution is added to the incubated supernatant to bring the calcium ion concentration to 0.004 to 0.015 molar; the preferred concentration of calcium ion in the incubated supernatant being 0.006 to 0.009 molar. If the calcium ion concentration is less than 0.004 molar the preparation has low thromboplastic activity and if the calcium ion concentration is greater than 0.015 molar the prothrombin time obtained when the preparation is used in a prothrombin determination is significantly increased. The suspension is centrifuged again and lyophilized.

The particular calcium salt employed is critical since it must be sufficiently soluble to give a 0.025 molar solution and release the appropriate concentration of calcium ions (about 0.009 M) on reconstitution of the lyophilized solid. Calcium chloride may be substituted for calcium gluconate but has a tendency to act as a dehydrating agent in a temperature range of 50° C. to 90° C. and pressure range of 1 micron to atmospheric pressure. For this reason, calcium gluconate is preferred to calcium chloride.

In the preparation of the second thromboplastic material from rabbit brain or lung tissue, or mixtures thereof, by extraction with a buffered aqueous alcohol solution containing a low molecular weight amino acid, the tissue or tissue mixture may be finely divided by any suitable means such as a Waring Blendor which homogenizes the tissue. It is preferred, in order that the yield of thromboplastin be efficient and destruction of thromboplastin at a minimum, for the tissue to be finely divided or homogenized at a temperature not above 25° C. and preferably within the range of from —5° to 25° C. and that the step of finely dividing or homogenizing the tissue be accomplished in the presence of the extracting solution. When the tissue is homogenized in a Waring Blendor in the presence of the extracting solution, the homogenizing step has been found to be sufficiently thorough in as short a time as thirty seconds.

The solution used for extracting finely divided tissue is a buffered aqueous alcohol solution. Ethanol or methanol may be the only alcohol in the extracting solution or a mixture of ethanol and methanol may be used. Alcohol or a mixture of alcohols may be present in the aqueous alcoholic extracting solution in an amount from about 5 to 20 percent by volume. An alcohol concentration of 15 to 20 percent is preferred. If the concentration of alcohol in the extracting solution is less than about five percent by volume, the thromboplastic active material is not obtained in the extracting solution in a state which will allow satisfactory separation thereof from the unextracted residual tissue, and if the concentration of alcohol in the extracting solution is greater than about twenty percent by volume, the solubility of the thromboplastic active material in the extracting solution is significantly decreased. The aqueous alcohol solution is buffered at a pH within the range of from 5 to 8 but the preferred buffering range is 5.5 to 6.5. If the aqueous alcohol solution is buffered at a pH below 5, the amount of thromboplastic active material extracted from tissue is significantly decreased because its solubility in the extracting solution is markedly lower, and if the aqueous alcohol solution is buffered at a pH above 8, significant amounts of inactive tissue components are present in the extracting solution. It is necessary that an alkali metal salt of a low molecular weight amino acid, and preferably an alkali metal salt of an amino acid having not more than nine carbon atoms, such as alanine, glycine, proline or serine be present as an active part of the buffer system in an amount wtihin the range of from 0.01 to 6.0 percent by weight of the buffered aqueous alcohol extracting solution; the preferred amount of low molecular weight amino acid is from one to two percent by weight. The presence in the extracting solution of the low molecular weight amino acid results in a significant increase in the amount of thromboplastic material extracted by the solution provided the amino acid is present in an amount within the range of from 0.01 to 6.0 percent by weight; if the amount is below this range, the increase in the amount of thromboplastic material extracted from tissue by the solution is not significant, and if the amount is above this range the material dissolved in the extracting solution results in a longer clotting time as measured by the Shapiro-Weiner method. Any acid buffer system effective over a pH range of 5 to 8 may be used to adjust the pH of the extracting solution. Specific acid buffer systems found suitable contain salts of acids such as phosphoric acid, amino acids, acetic acid and citric acid. An alkali metal hydroxide may be used in conjunction with the acid buffer systems to adjust the pH of the extracting solution to the desired level.

The amount of buffered aqueous alcohol solution used in the extraction may vary widely but for most efficient extraction of thromboplastin from the tissue it has been found desirable to use at least four milliliters of extracting solution for each gram of tissue to be extracted. The finely divided tissue in association with the buffered aqueous alcohol solution is thoroughly stirred at a temperature not above 25° C. and preferably not above 5° C. and centrifuged. The supernatant is filtered to remove any fat present and dialyzed against distilled water not above 25° C., preferably at a temperature not above 5° C. At a temperature above 25° C. a significant amount of thromboplastic active material is destroyed. After dialysis, however, the dialysate may be heated at 49° C. to 50° C. and held at that temperature for about one hour. Thus, heat treatment of the dialysate removes unstable accelerators and inhibitors present in the extract and permits the storage of dialysate at 5° C. for more than a week with very slight loss of activity. The heat treatment of 49° C. for 60 minutes also removes chromogenic materials. It will be appreciated that similar results may be obtained by heating for a longer time at a lower temperature, i.e., two hours at 40° C.

In order that those skilled in the art may better understand how the present invention may be carried into effect, the following example is given by way of illustration and not by way of limitation.

*Example I*

In the preparation of the first thromboplastic material, according to the method of Quick; three clean rabbit brains weighing about 21 grams were placed in a glass mortar and covered with 30 cc. of acetone and 0.1 cc. of 0.2 molar sodium citrate. The brains were crushed and mashed with a glass pestle in a manner to avoid grinding. The acetone was poured off, 25 cc. of fresh acetone was added, and the brain tissue was again crushed and mashed. The second portion of acetone was poured off, 25 cc. of fresh acetone was added to the brain tissue and the brain tissue was carefully ground in the presence of the acetone. The acetone was poured off, another 25 cc. portion of acetone was added and the brain tissue was ground under the acetone until it was granular and nonadhesive. The residual brain tissue was filtered by suction, washed six times with 10 cc. portions of fresh acetone, dried by suction, transferred to a filter paper, and dried at 37° C. for thirty minutes. 3.5 grams of ivory-white, finely granular material was obtained.

In the preparation of the second thromboplastic material from the extraction of rabbit brain or lung tissue, or a mixture thereof, with a buffered aqueous alcohol solution containing a low molecular weight amino acid; 76 grams of frozen rabbit brain and 1440 grams of frozen rabbit lung were homogenized at 5° C. for one minute in the presence of 7600 ml. of an aqueous solution containing 150 ml. of an alcoholic solution per liter, prepared by adding 7.5 ml. of methanol, 15 grams of glycine, 4.8 ml. of one molar aqueous sodium acetate solution, and 2.6 ml. of one molar aqueous acetic acid solution to 142.5 ml. of 95 percent ethanol. The homogenate was stirred for two hours at 5° C. and centrifuged at 5° C. for thirty minutes. The supernatant liquid was filtered and dialyzed against distilled water at 5° C. The dialysate was heated to 49° C. in a 50° C. water bath and held at that temperature for 60 minutes. The incubated dialysate was centrifuged for twenty minutes; it can be used directly for the preparation of improved thromboplastin material, as described below, or it may be stored at 5° C. and used within one week of its preparation.

In the preparation of the improved thromboplastic material, 200 mg., 100 mg., and 50 mg., respectively of the first thromboplastic material produced by the method of Quick were suspended in 10 ml. aliquots of the incubated dialysate of the second thromboplastic material. Each 10 ml. aliquot contained about 40–50 mgs. of the second thromboplastic material. The suspension was incubated at 50° C. for twenty minutes and centrifuged. Sufficient dilute aqueous calcium gluconate was added to the supernatant to bring the calcium ion concentration to 0.006 molar, and the suspensions were again centrifuged. The supernatants, which are highly active calcium-thromboplastin suspensions, may be used without modification in the determination of prothrombin time by the Shapiro-Weiner, as described in a book entitled: "Coagulation, Thrombosis, and Dicumarol," by Shapiro and Weiner, published in 1949 by the Brooklyn Medical Press, Brooklyn, New York, method or may be lyophilized and reconstituted with distilled water as desired. The thromboplastic activity of the first and second thromboplastic materials and of the improved mixture of thromboplastic materials were determined by the Shapiro-Weiner method for determining prothrombin time of blood.

A calcium-thromboplastin suspension of the first thromboplastic material was prepared in a test tube by adding 400 mgs. thereof to 10 ml. of 0.85 percent aqueous sodium chloride solution in one tube, and 400 mgs. thereof to 10 my. of distilled water. The solids were suspended by inverting the tube three or four times until uniform suspensions were obtained, keeping the suspensions in a water bath at 49°–51° C. for twenty minutes, centrifuging, cooling the supernatant to room temperature, adding 0.1 ml. of 0.25 molar calcium gluconate solution to 4 ml. of the suspension, mixing as above, and centrifuging again. The supernatants may be used without modification in the determination of prothombin time by the Shapiro-Weiner method or may be lyophilized and reconstituted with distilled water as desired.

A calcium-thromboplastic suspension of the second thromboplastic active material in water was prepared in thte same way as described above by adding calcium gluconate solution to the incubated centrifuged dialysate.

Two-tenths ml. of each of the calcium-thromboplastin reconstituted solids prepared as above and two-tenths ml. of the supernatant from the preparation of the improved thromboplastic material described in Example I above, were each added to a separate 0.1 ml. portion of fresh, oxalated, human plasma which had been prepared by the addition of 0.1 molar aqueous sodium oxalate solution to fresh, human blood in the proportion of one part sodium oxalate solution to nine parts of blood and centrifugation of the oxalated blood. The mixtures were agitated at 37° C. by tilting the test tubes back and forth and timing the first appearance of a fibrin clot. The suspension containing the first thromboplastin material in 0.85% aqueous sodium chloride solution showed clot formation in 19.5 seconds, while that containing the first thromboplastin material in distilled water showed clot formation in 17.5 seconds. The suspension of the second thromboplastin material alone showed clot formation in 24.4 sec. The suspensions of the improved thromboplastin material showed clot formation respectively in 15.0, 16.4, and 17.5 seconds for concentrations of 20, 10, and 5 mg./ml. of the first thromboplastin material.

It will be obvious to those skilled in the art that various changes may be made without departing from the spirit of the invention and therefore it is to be understood that the invention is not limited to what is described in the specification and example but only as indicated in the appended claims.

What is claimed is:

1. A process for the preparation of thromboplastic material comprising the steps of: preparing a first thromboplastic material by extracting rabbit brain tissue with acetone until the residual brain tissue is granular and non-adhesive, separating the residual tissue from the acetone extract by filtration and discarding the acetone extract; preparing a second thromboplastic material by extracting finely divided rabbit tissue selected from the class consisting of brain and lung tissue, with an aqueous solution buffered at a pH within the range of 5–8 and containing an alcohol selected from the group consisting of methanol and ethanol and mixtures thereof in the amount of 5–20 percent by volume and 0.01–6.0 percent by weight of an amino acid having not more than 9 carbon atoms, separating the finely divided tissue from the extracting solution, dialyzing the extracting solution against distilled water and heating the material within the dialysis sac at 40° C.,–50° C. for sufficient time to destroy unstable accelerators and inhibitors; suspending from about 10 to about 400 parts by weight of the first thromboplastic material and from about 20 to about 100 parts by weight of the second thromboplastic material in about 10,000 parts by weight water; incubating the aqueous suspension followed by centrifuging the incubated suspension, adding an aqueous solution of a calcium salt selected from the group consisting of calcium chloride and calcium gluconate to the supernatant from the centrifugation in an amount such that the calcium ion concentration is 0.004–0.015 molar and centrifuging to provide a supernatant containing a highly active thromboplastic material.

2. A process according to claim 1 in which the calcium salt is calcium gluconate.

3. A process according to claim 1 in which the calcium salt is calcium chloride.

4. A process for the preparation of thromboplastic material comprising the steps of: preparing a first thromboplastic material by extracting rabbit brain tissue with acetone until the residual brain tissue is granular and non-adhesive, separating the residual tissue from the acetone extract by filtration and discarding the acetone extract; preparing a second thromboplastic material by extracting finely divided rabbit tissue selected from the class consisting of brain and lung tissue, with an aqueous solution buffered at a pH within the range of 5–8 and containing an alcohol selected from the group consisting of methanol and ethanol and mixtures thereof in the amount of 15–20 percent by volume and 0.01–6.0 percent by weight of an amino acid having not more than 9 carbon atoms, separating the finely divided tissue from the extracting solution, dialyzing the extracting solution against distilled water and heating the material within the dialysis sac at about 50° C. for about one hour to destroy unstable accelerators and inhibitors; suspending from about 200 to about 400 parts by weight of the first thromboplastic material and from about 40 to about 50 parts by weight of the second thromboplastic material in about 10,000 parts by weight water; incubating the aqueous suspension about 20 minutes at 50° C., followed by centrifuging the incubated suspension, adding an aqueous solution of a calcium salt selected from the group consisting of calcium chloride and calcium gluconate to the supernatant from the centrifugation in an amount such that the calcium ion concentration is about 0.009 molar and centrifuging to provide a supernatant containing a highly active thromboplastic material.

5. A process according to claim 4 in which the calcium salt is calcium gluconate.

6. A process according to claim 4 in which the calcium salt is calcium chloride.

7. A process for the preparation of thromboplastic material comprising the steps of: preparing a first thromboplastic material by extracting rabbit brain tissue with acetone until the residual brain tissue is granular and non-adhesive, separating the residual tissue from the acetone extract by filtration and discarding the acetone extract; preparing a second thromboplastic material by extracting at a temperature not greater than 25° C. finely divided rabbit tissue selected from the class consisting of brain and lung tissue, with an aqueous solution buffered at a pH within the range of 5.5–6.5 and containing an alcohol selected from the group consisting of methanol and ethanol and mixtures thereof in the amount of 5–20 percent by volume and 1–2 percent by weight of an amino acid having not more than 9 carbon atoms, separating the finely divided tissue from the extracting solution, dialyzing the extracting solution against distilled water and heating the material within the dialysis sac at about 50° C. for about 1 hour to destroy unstable accelerators and inhibitors; suspending from about 10 to about 400 parts by weight of the first thromboplastic material and from about 20 to about 100 parts by weight of the second thromboplastic material in about 10,000 parts by weight water; incubating the aqueous suspension followed by centrifuging the incubated suspension, adding an aqueous solution of a calcium salt selected from the group consisting of calcium chloride and calcium gluconate to the supernatant from the centrifugation in an amount such that the calcium ion concentration is 0.004–0.015 molar and centrifuging to provide a supernatant containing a highly active thromboplastic material.

8. A process according to claim 7 in which the calcium salt is calcium gluconate.

9. A process according to claim 7 in which the calcium salt is calcium chloride.

10. A process for the preparation of thromboplastic material comprising the steps of: preparing a first thromboplastic material by extracting rabbit brain tissue with acetone until the residual brain tissue is granular and non-adhesive, separating the residual tissue from the acetone extract by filtration and discarding the acetone extract; preparing a second thromboplastic material by extracting finely divided rabbit tissue selected from the class consisting of brain and lung tissue, with an aqueous solution buffered at a pH within the range of 5–8 and containing an alcohol selected from the group consisting of methanol and ethanol and mixtures thereof in the amount of 5–20 percent by volume and 0.01–6.0 percent by weight of an amino acid having not more than 9 carbon atoms, separating the finely divided tissue from the extracting solution, dialyzing the extracting solution against distilled water and heating the material within the dialysis sac at about 50° C. for about one hour to destroy unstable accelerators and inhibitors; suspending from about 200 to about 400 parts by weight of the first thromboplastic material and from about 40 to about 500 parts by weight of the second thromboplastic material in about 10,000 parts by weight water; incubating the aqueous suspension about 20 minutes at 50° C., followed by centrifuging the incubated suspension, adding an aqueous solution of a calcium salt selected from the group consisting of calcium chloride and calcium gluconate to the supernatant from the centrifugation in an amount such that the calcium ion concentration is 0.009 molar and centrifuging to provide a supernatant containing a highly active thromboplastic material.

11. A process according to claim 10 in which the calcium salt is calcium gluconate.

12. A process according to claim 10 in which the calcium salt is calcium chloride.

13. A process according to claim 10 in which the low molecular weight amino acid is glycine.

14. A highly active thromboplastic material obtained by: preparing a first thromboplastic material by extracting rabbit brain tissue with acetone until the residual brain tissue is granular and non-adhesive, separating the residual tissue from the acetone extract by filtration and discarding the acetone extract; preparing a second thromboplastic material by extracting finely divided rabbit tissue selected from the class consisting of brain and lung tissue, with an aqueous solution buffered at a pH within the range of 5–8 and containing an alcohol selected from the group consisting of methanol and ethanol and mixtures thereof in the amount of 5–20 percent by volume and 0.01–6.0 percent by weight of an amino acid having not more than 9 carbon atoms, separating the finely divided tissue from thte extracting solution, dialyzing the extracting solution against distilled water and heating the material within the dialysis sac at 40° C.–50° C. for sufficient time to destroy unstable accelerators and inhibitors; suspending from about 100 to about 400 parts by weight of the first thromboplastic material and from about 20 to about 200 parts by weight of the second thromboplastic material in about 10,000 parts by weight water; incubating the aqueous suspension followed by centrifuging the incubated suspension, adding an aqueous solution of a calcium salt selected from the group consisting of calcium chloride and calcium gluconate to the supernatant from the centrifugation in an amount such that the calcium ion concentration is 0.004–0.015 molar and centrifuging to provide a supernatant containing a highly active thromboplastic material.

15. A highly active thromboplastic material prepared by the process of claim 14 in which the calcium salt is calcium gluconate.

16. A highly active thromboplastic material prepared by the process of claim 14 in which the calcium salt is calcium chloride.

17. A lyophilized product obtained by dehydrating the thromboplastic material prepared according to the method of claim 14.

References Cited in the file of this patent

UNITED STATES PATENTS 2,162,863    Ripke _____ June 20, 1939

OTHER REFERENCES

Quick: Am. J. Physiol., vol. 119, 1936, pp. 282 and 291.
Quick: The Hemorrhagic Diseases, 1942, pp. 64–67.
Hardy: Chem. Abst., vol. 45, March 1951, p. 2046a.
Wintrobe: Clin. Hematology, 2nd ed., 1946, Lea and Febiger, Phila., Pa., p. 208.
Poncher: J. Lab. and Clin. Med., No. 27, December 1941, pp. 385–391.